United States Patent
Ohata et al.

(10) Patent No.: US 6,752,112 B1
(45) Date of Patent: Jun. 22, 2004

(54) ENGINE-STARTING AND STOPPING SYSTEM IN VEHICLE

(75) Inventors: Satoru Ohata, Saitama (JP); Kazuma Okuda, Saitama (JP); Shunichi Tsuzuki, Saitama (JP); Tadashi Fujiwara, Saitama (JP); Kazuyuki Kubo, Saitama (JP); Masaaki Kaizuka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 191 days.

(21) Appl. No.: 10/019,742

(22) PCT Filed: Jun. 22, 2000

(86) PCT No.: PCT/JP00/04083

§ 371 (c)(1),
(2), (4) Date: Dec. 28, 2001

(87) PCT Pub. No.: WO01/02721

PCT Pub. Date: Jan. 11, 2001

(30) Foreign Application Priority Data

Jul. 5, 1999 (JP) .......................................... 11-190231

(51) Int. Cl.[7] .............................................. F02N 17/00
(52) U.S. Cl. .................................. 123/179.4; 123/179.1
(58) Field of Search .......................... 123/179.1, 179.3, 123/179.4, 179.28

(56) References Cited

U.S. PATENT DOCUMENTS

| 5,927,240 | A | * | 7/1999 | Maxon ..................... 123/179.3 |
| 6,283,086 | B1 | * | 9/2001 | Yamamoto et al. ..... 123/198 D |
| 6,401,012 | B1 | * | 6/2002 | Aoki et al. ..................... 701/1 |
| 6,453,864 | B1 | * | 9/2002 | Downs et al. ........... 123/179.3 |
| 6,453,865 | B2 | * | 9/2002 | Hirose et al. ............ 123/179.4 |
| 6,460,500 | B1 | * | 10/2002 | Ooyama et al. ......... 123/179.3 |

FOREIGN PATENT DOCUMENTS

| JP | 58-142378 | 9/1983 |
| JP | 08-014145 | 1/1996 |

* cited by examiner

Primary Examiner—John Kwon
(74) Attorney, Agent, or Firm—Carrier, Blackman & Associates, P.C.; Joseph P. Carrier; William D. Blackman (57) ABSTRACT

In an engine-starting and stopping system in a vehicle, a crank pulley for driving auxiliary parts by an endless belt is mounted at an end of a crankshaft protruding from a cylinder block of an engine, and a starter motor for cranking the crankshaft is accommodated in an internal space in the crank pulley. The starter motor includes a rotor having a permanent magnet fixed to an inner peripheral surface of a peripheral wall of the crank pulley, and a stator having a coil fixed to an outer surface of a chain cover. Thus, the starter motor for automatically carrying out the restarting of the engine after stopping of the engine can be laid out compactly.

4 Claims, 13 Drawing Sheets

ENGINE-STARTING AND STOPPING SYSTEM IN VEHICLE

FIELD OF THE INVENTION

The present invention relates to a vehicle provided with an automatically engine-starting and stopping means for automatically stopping an engine, when predetermined engine-stopping conditions have been established, and for automatically starting the engine, when predetermined engine-starting conditions have been established.

BACKGROUND ART

A conventional vehicle using an engine as a traveling drive source suffers from the following problem: The engine once started is not stopped, unless a driver turns off an ignition switch. Therefore, for example, while the driver is waiting at traffic lights, a wasteful idling operation in the engine is continued to wastefully consume the fuel. To avoid this problem, every time the vehicle is stopped, the driver may turn off the ignition switch to stop the engine. In such a case, however, the driver must repeat the starting and stopping of the engine and hence, the operation is extremely troublesome.

Therefore, there is a conventionally proposed engine-starting and stopping system in a vehicle, which is designed so that when the vehicle is stopped, an engine is stopped automatically, and when a driver's intent to start the vehicle has been detected in such state, a starter motor is operated automatically to start the engine, thereby providing a reduction in amount of fuel consumed (for example, see Japanese Utility Model Application Laid-open No. 58-142378).

The conventional starter motor of the engine for the vehicle is operable to start the engine by bringing a ring gear provided around an outer periphery of a flywheel mounted in a transmission into meshed engagement with a pinion and hence, the conventional vehicle suffers from a problem that the size of the transmission is increased to ensure a space for mounting of the starter motor.

DISCLOSURE OF THE INVENTION

The present invention has been accomplished with the above circumstances in view, and it is an object of the present invention to lay out as compact as possible a starter motor and generator for automatically restating the engine after stopping of the engine.

To achieve the above object, according to the present invention, there is provided an engine-starting and stopping system in a vehicle including an automatically engine-starting and stopping means for automatically stopping an engine, when predetermined engine-stopping conditions have been established, and for automatically starting the engine, when predetermined engine-starting conditions have been established, characterized in that the engine-starting and stopping system is comprised of a starter motor and generator for starting the engine, the starter motor and generator being accommodated within a pulley mounted on a crankshaft of the engine.

With the above arrangement, the starter motor and generator for automatically starting the engine which has been stopped is accommodated within the pulley mounted on the crankshaft of the engine. Therefore, it is possible to suppress, to the minimum, the increase in size of the engine or the transmission due to the mounting of the starter motor and generator.

In addition to the above arrangement, there is provided an engine-starting and stopping system in a vehicle, wherein the starter motor and generator includes a coil forming a stator, and a permanent magnet forming a rotor, the permanent magnet being mounted on an inner peripheral surface of the pulley which is formed into a hollow shape to cover one side surface and an outer peripheral surface of the coil, so that the permanent magnet is opposed to the outer peripheral surface of the coil.

With the above arrangement, the permanent magnet is mounted on the inner peripheral surface of the pulley which is formed into a hollow shape to cover one side surface and an outer peripheral surface of the coil, so that the permanent magnet is opposed to the outer peripheral surface of the coil. Therefore, the starter motor and generator can be accommodated compactly within the pulley without provision of special spaces for mounting them in the engine and the transmission.

BRIEF DESCRIPTION OF THE DRAWINGS

FIGS. 1 to 7 show a first embodiment of the present invention, wherein

FIGS. 8 to 13 show a second embodiment of the present invention, wherein

BEST MODE FOR CARRYING OUT THE INVENTION

The mode for carrying out the present invention will now be described by way of embodiments shown in the accompanying drawings.

FIGS. 1 to 7 show a first embodiment of the present invention.

Figure 1:
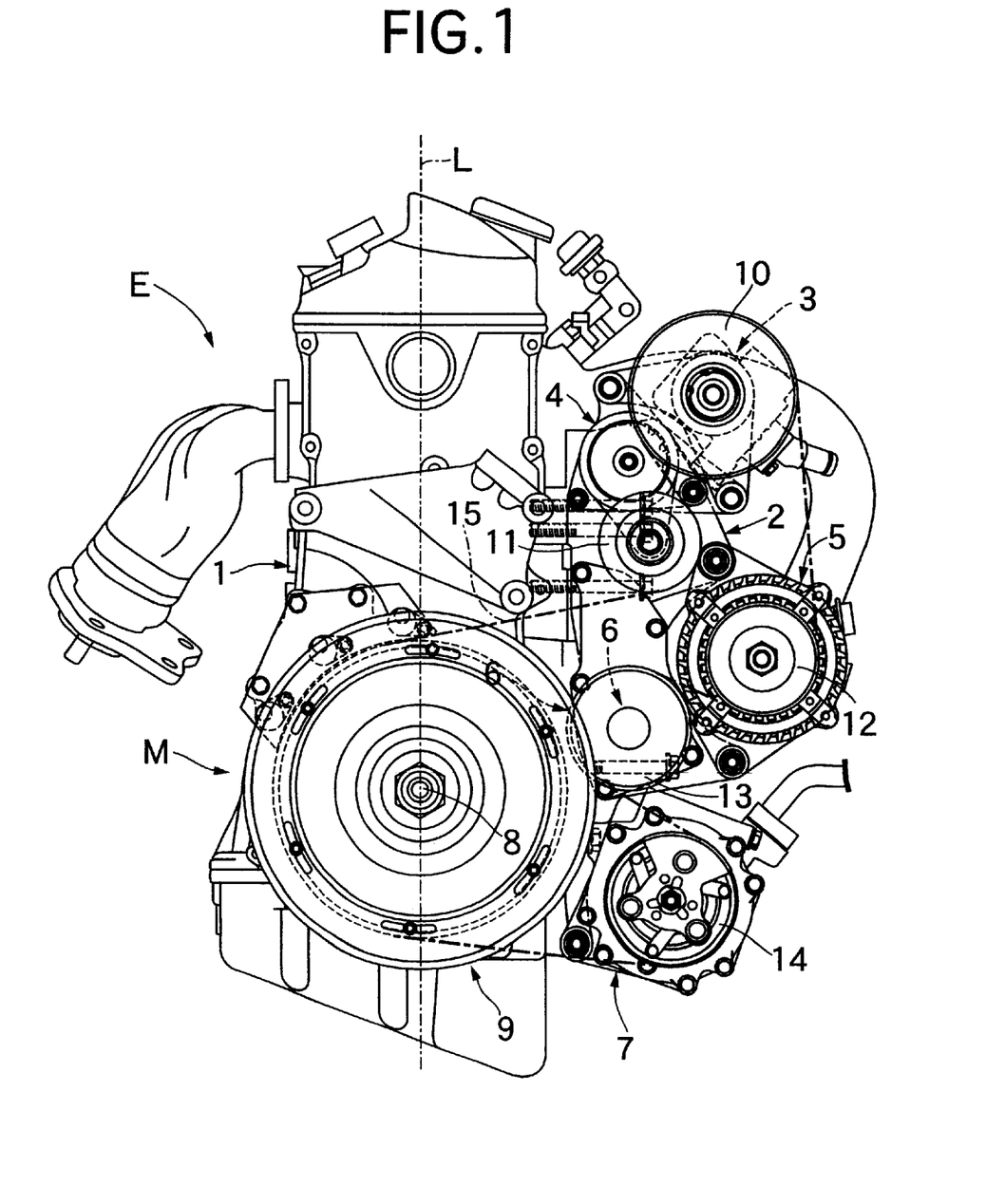
FIG. 1 is a view of an in-line type multi-cylinder engine, taken in an axial direction of a crankshaft.

As shown in FIG. 1, an auxiliary part-mounting bracket 2 is fixed to a side of a cylinder block 1 of an in-line type multi-cylinder engine E mounted in a vehicle, and an oil pump 3 for a power-steering operation, an auto-tensioner 4, an alternator 5, an engine-cooling water pump 6 and an air-conditioning compressor 7 are fixed to the auxiliary part-mounting bracket 2. A single endless belt 15 is wound around a crank pulley 9 mounted at an end of a crankshaft 8 of the engine E (at an end opposite from a transmission), an oil pump pulley 10 mounted in the oil pump 3, a tensioner pulley 11 mounted on the auto-tensioner 4, an alternator pulley 12 mounted in the alternator 5, a water pump pulley 13 mounted in the water pump 6 and a compressor pulley 14 mounted in the compressor 7. Thus, a driving force of the crankshaft 8 is transmitted to the oil pump 3, the alternator 5, the water pump 6 and the compressor 7 by the endless belt 15, and a tension is provided to the endless belt 15 by the auto-tensioner 4.

The tensioner pulley 11 and the water pump pulley 13 are driven by a back of the endless belt 15. By using the single endless belt 15 and utilizing the back of the endless belt 15 in the above manner, the auxiliary parts 3 to 7 can be disposed closely to one another and compactly, and also the angle of winding of the endless belt 15 around each of the pulleys 10 to 14 can be ensured sufficiently to reliably drive the auxiliary parts 3 to 7.

Figure 2:
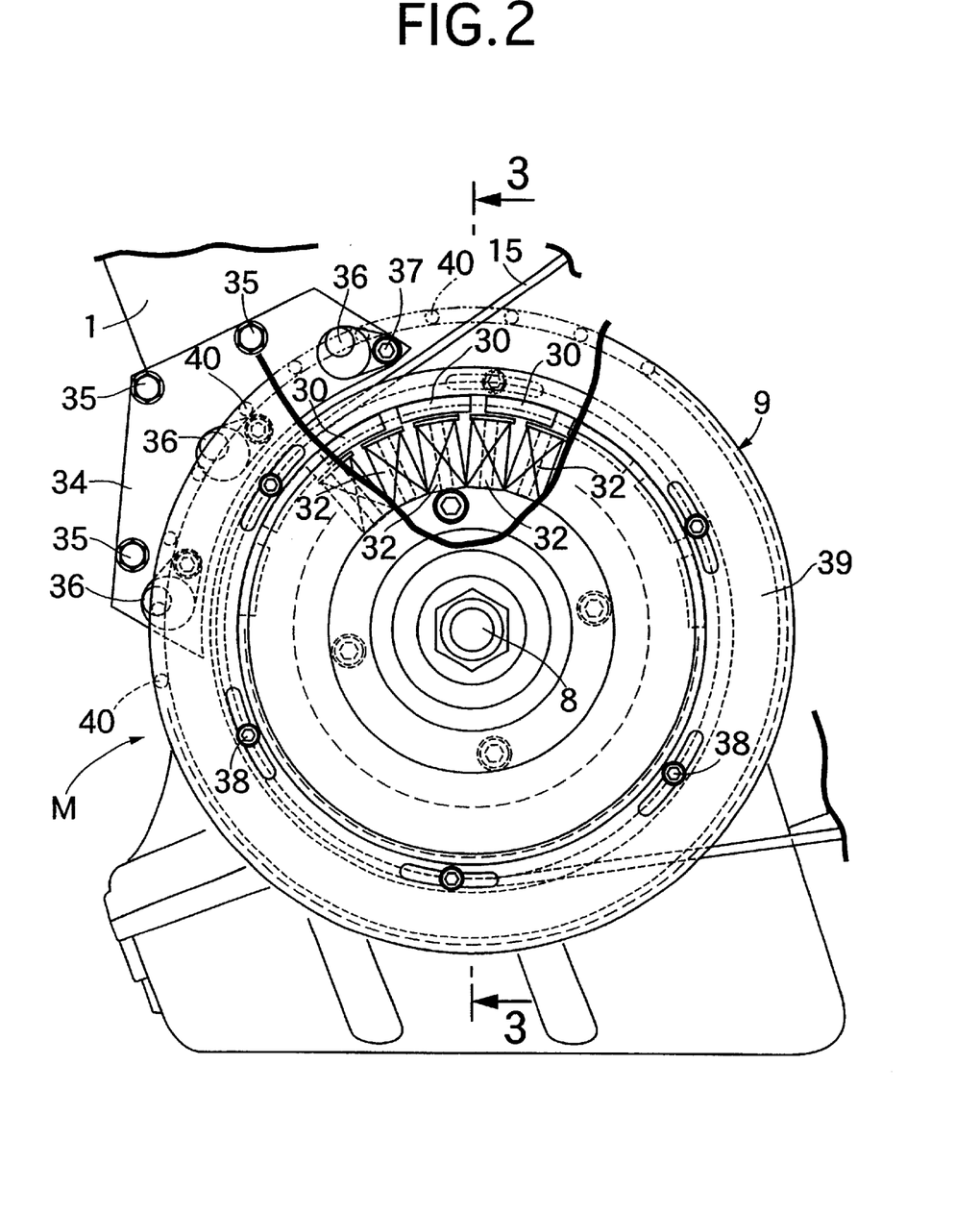
FIG. 2 is an enlarged view of an essential portion of FIG. 1.
Figure 3:
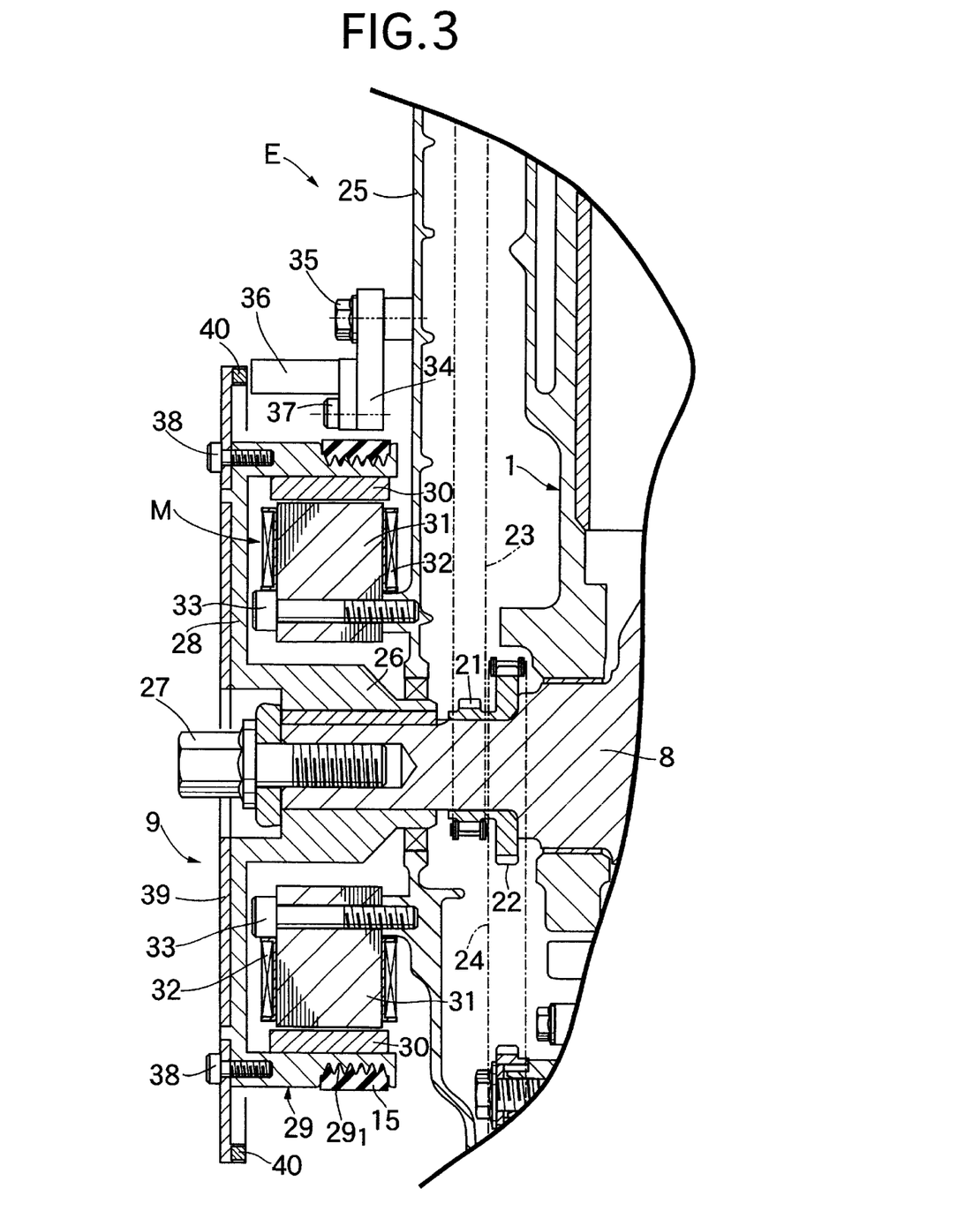
FIG. 3 is a sectional view taken along a line 33 in FIG. 2.

As can be seen from FIGS. 2 and 3, a cam shaft driving sprocket 21 and a balancer shaft driving sprocket 22 integrally formed with each other are fixed to the crankshaft 8 protruding from the cylinder block 1. An endless chain 23 wound around the cam shaft driving sprocket 21 and an endless chain 24 wound around the balancer shaft driving sprocket 22 are covered with a chain cover 25 fixed to the cylinder block 1.

A boss 26 of the crank pulley 9 is fitted over and fixed by a bolt 27 to the end of the crankshaft 8 protruding from the chain cover 25. An annular peripheral wall 29 is integrally formed at an outer end of a disk-shaped sidewall 28 extending radially from the boss 26 of the crank pulley 9, and a pulley groove $29_1$ is defined in an outer peripheral surface of the peripheral wall 29, so that the endless belt 15 is engaged in the pulley groove $29_1$. An annular space is defined within the crank pulley 9 and surrounded by the sidewall 28 and the peripheral wall 29, and a starter motor and generator M is accommodated in the space.

The starter motor and generator M includes a plurality of permanent magnets 30 fixed along an inner peripheral surface of the peripheral wall 29 of the crank pulley 9. The permanent magnets 30 form a rotor of the starter motor and generator M. A plurality of coils 32 are wound around cores 31, respectively and fixed to an outer surface of the chain cover 25 by bolts 33 to surround the periphery of the crankshaft 8. The coils 32 form a stator of the starter motor and generator M, and have outer peripheral surfaces opposed to inner peripheral surfaces of the permanent magnets 30 with a small air gap left therebetween.

A plate-shaped mounting bracket 34 is fixed to an outer surface of the chain cover 25 by three bolts 35, and three rotational speed sensors 36 are fixed to the mounting bracket 34 by bolts 37, respectively. A disk 39 fixed to the sidewall 28 of the crank pulley 9 by bolts 38 is provided at its outer periphery with a plurality of portions 40 to be detected by the rotational speed sensors 36.

Thus, if the coils 32 of the starter motor and generator M are deexcited, the crank pulley 9 only functions as a mere pulley. However, an attracting force and a repelling force are applied to the permanent magnets 30 by alternately exciting the coils 32 at a predetermined timing to rotate the crank pulley 9 to crank the crankshaft 8, thereby restarting the stopped engine E. When the crankshaft 8 is rotated by a driving force transmitted from a driving wheel back to the engine E during braking of the vehicle, the starter motor and generator M functions as a generator to generate a regenerative braking force.

As described above, the starter motor and generator M for starting the engine E is accommodated in the crank pulley 9, and hence, the increases in sizes of the engine E and the transmission due to the mounting of the starter motor and generator M can be suppressed to the minimum, and the engine E and the transmission can easily be mounted in an engine room.

In the present embodiment, the engine E is subjected to controls (an idle stopping control and a restarting control) for stopping the engine E automatically upon stopping of the vehicle in order to reduce the amount of fuel consumed and for restarting the engine E automatically upon starting of the vehicle. However, only the starting of the engine E by turning on an ignition switch is carried out by a conventional starter motor (not shown) mounted on the transmission. A general-purpose battery of 12 V for supplying electric power to a head light, an air-conditioner, an audio-set and the like is used for a power source for the conventional starter motor, but an exclusive battery of 36 V different from the general-purpose battery is used for the starter motor and generator M in this embodiment.

The contents of a decelerating fuel-cut control and a control of the stopping and starting of the engine E of the vehicle including a continuously variable automatic transmission (CVT) will be described below.

Figure 4:
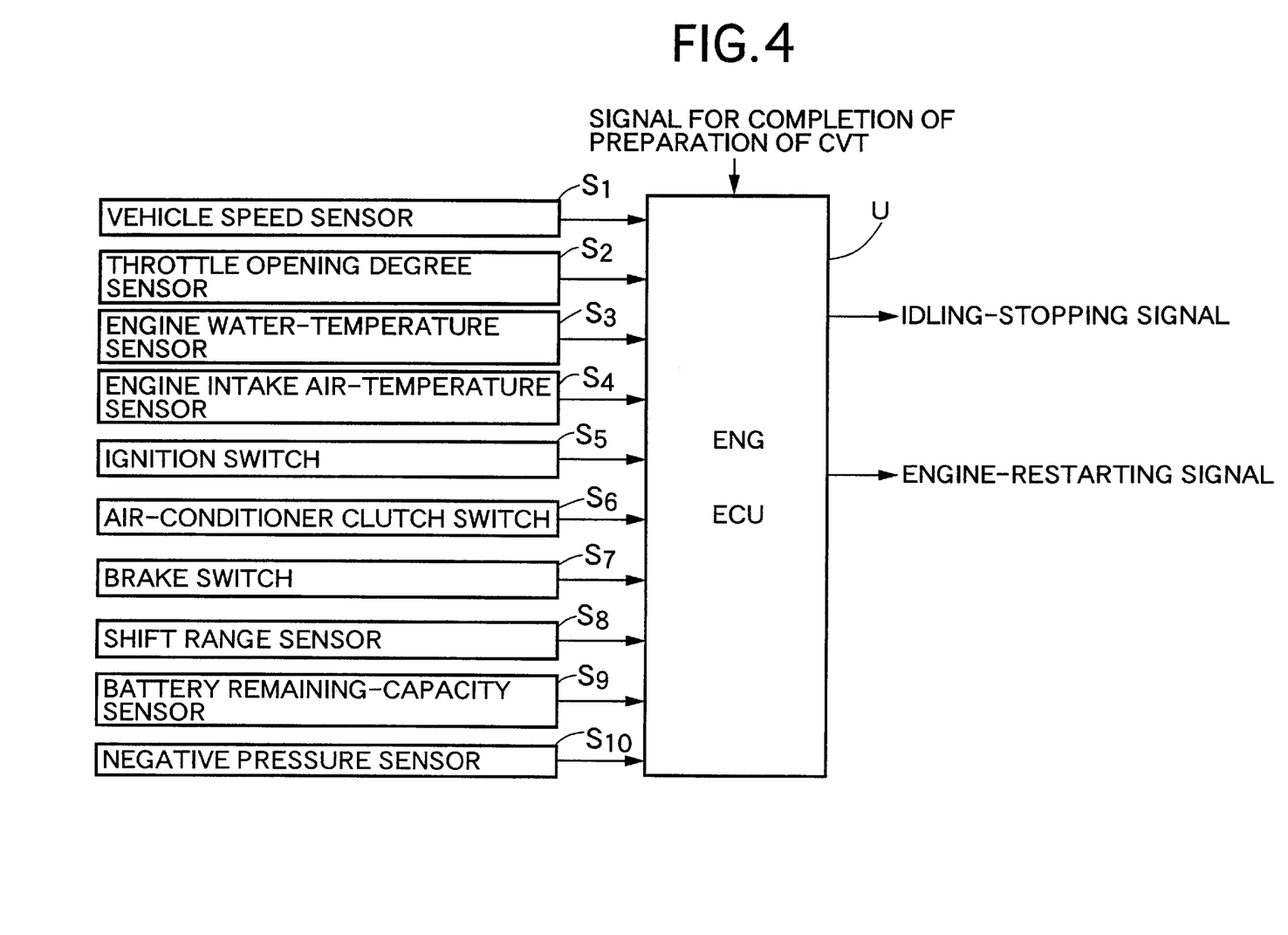
FIG. 4 is a block diagram of a control system for the engine.

As shown in FIG. 4, connected to an electronic control unit U including an automatically engine-starting and stopping means are a vehicle speed sensor $S_1$ for detecting a vehicle speed, a throttle opening degree sensor $S_2$ for detecting a throttle opening degree, an engine water-temperature sensor $S_3$ for detecting a temperature of water in the engine, an engine intake air-temperature sensor $S_4$ for detecting a temperature of intake air in the engine, an ignition switch $S_5$, an air-conditioner clutch switch $S_6$ for controlling the operation of an air-conditioner clutch, a brake switch $S_7$ for detecting the operation of a brake pedal, a shift range sensor $S_8$ for detecting a shift range in the automatic transmission, a battery remaining-capacity sensor $S_9$ for detecting a remaining capacity of the battery for driving the starter motor and generator M, and a negative-pressure sensor $S_{10}$ for detecting a negative pressure in a vacuum booster for a brake device. Input to the electronic control unit U is a signal indicative of the completion of preparation of the CVT, namely, a signal indicating that the ratio of the CVT has been returned to a LOW range and a CVT starting clutch has been turned off, in addition to signals from the sensors and switches $S_1$ to $S_{10}$. The decelerating fuel-cut control and the control of the stopping and starting of the engine E are carried out based on these signals.

When the vehicle is brought into a decelerated state during traveling, cut-off of the fuel supplied to the engine E (a decelerating fuel-cut operation) is carried out, leading to a reduction in amount of fuel consumed. If a driver does not have intent to stop the vehicle at that time, the supplying of the fuel is restarted so that the engine E is not stopped at the time when the engines speed is reduced to a fuel-cut canceling speed. If the driver has intent to stop the vehicle, the fuel-cut operation is continued to stop the engine E (stop the idling) in a case where predetermined conditions have been established, in order to avoid the consumption of the fuel due to an idle operation during stopping of the vehicle.

When the driver has released his foot from the brake pedal during the decelerating fuel-cut operation of the vehicle to turn off the brake switch $S_7$, or when the driver has depressed down an accelerator pedal to bring the throttle opening degree detected by the throttle opening degree sensor $S_2$ from a fully-closed level to an opened level, it is determined that the driver does not have intent to stop the vehicle, whereby the canceling of the fuel-cut operation is carried out. On the other hand, when conditions shown in FIG. 5 have been established, the decelerating fuel-cut operation is continued without canceling of the fuel-cut operation, and the idling of the engine E is stopped simultaneously with the stopping of the vehicle.

Figure 5:
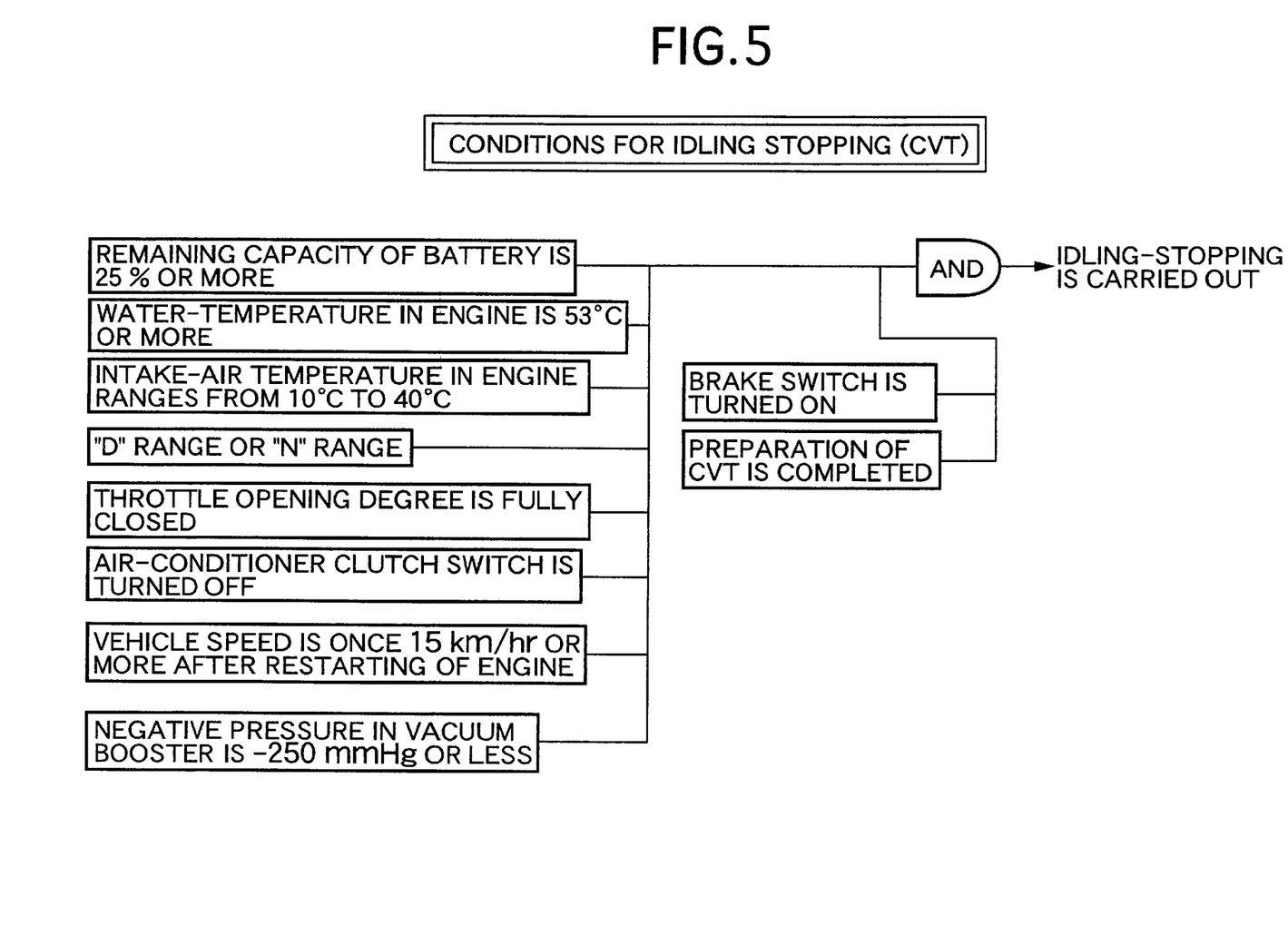
FIG. 5 is a diagram for explaining conditions for stopping the idling of the engine.

FIG. 5 shows conditions for stopping of the idling of the engine E. More specifically, the idling of the engine E is stopped without canceling of the fuel-cut operation, when the brake switch $S_7$ is in a turned-on state, the CVT is in a preparation-completed state (a state in which the ratio has been returned to LOW and the starting clutch has been turned off) and in addition, the remaining capacity of the battery detected by the battery remaining capacity sensor $S_9$ is 25% or more to permit the driving of the starter motor and generator M; the temperature of water in the engine detected by the engine water-temperature sensor $S_3$ is 53° C. or more and hence, the warming of the engine E has been completed; the temperature of an intake air in the engine detected by the engine intake-air temperature sensor $S_4$ ranges from 10° C. to 40° C. and hence, the battery can exhibit a performance sufficiently; the shift range detected by the shift range sensor $S_8$ is a "D" range or an "N" range; the throttle opening degree detected by the throttle opening degree sensor $S_2$ is a value indicative of a fully-opened state; the driver does not have intent to accelerate the vehicle, and the air-conditioner clutch switch $S_6$ has already been turned off, and there is not a possibility that the air-conditioner which is in operation might be stopped by the stopping of the idling; the vehicle speed detected by the vehicle speed sensor $S_1$ after restarting of the engine E has once become 15 km/hr or more; and the negative pressure in the vacuum booster detected by the negative pressure sensor $S_{10}$ is −250 mmHg or less in a gauge pressure to ensure the operation of the brake device.

The reason why the stopping of the idling is not carried out before the vehicle speed once becomes 15 km/hr or more after restarting of the engine E is for the purpose of preventing the stopping of the idling from being carried out at a short time interval when the vehicle must be started and stopped repeatedly due to a traffic snarl or the like.

Figure 6:
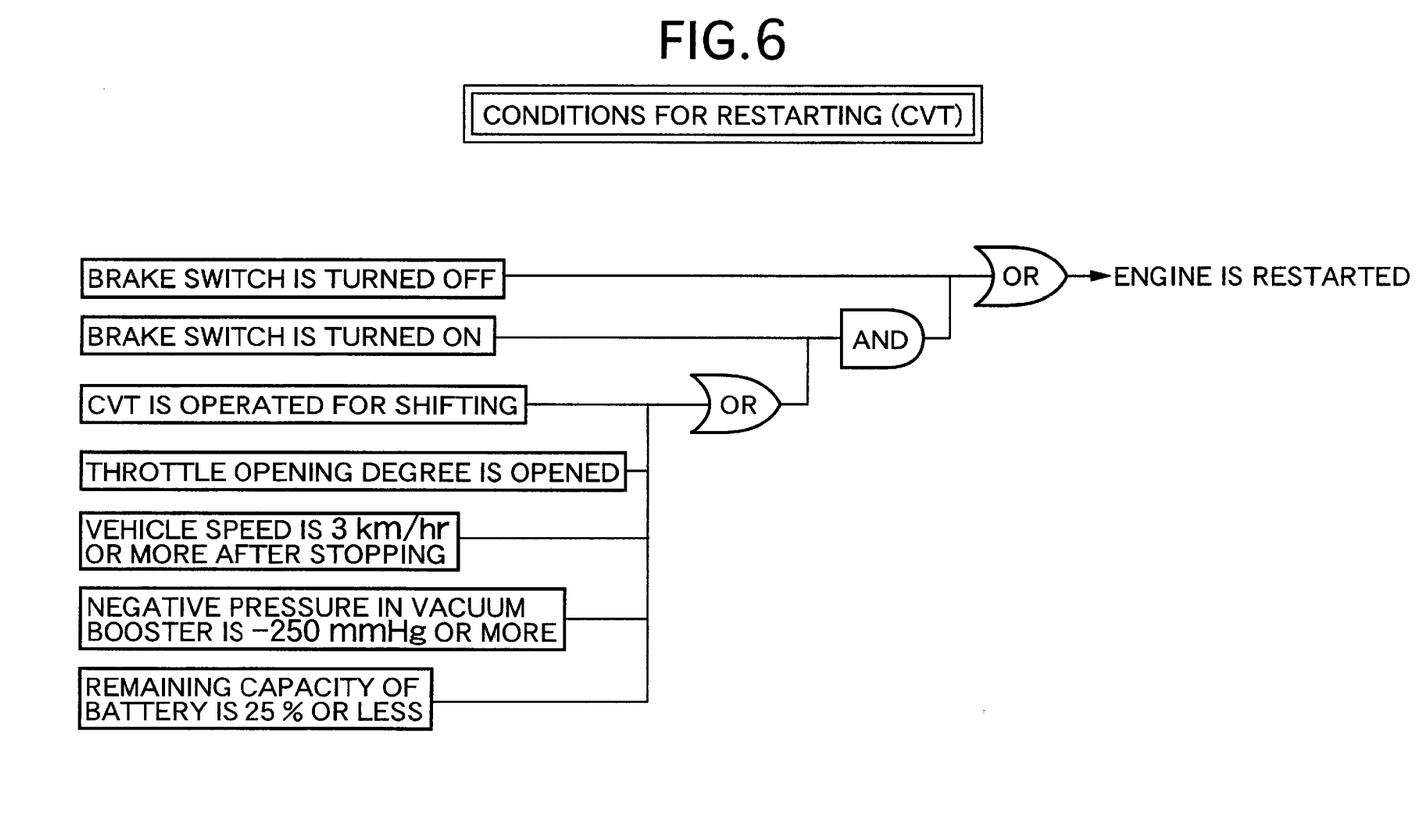
FIG. 6 is a diagram for explaining conditions for restarting the engine.

FIG. 6 shows conditions for restarting the engine E during stopping of the idling. When the driver has released his foot from the brake pedal to turn off the brake switch $S_7$, it is determined that the driver has intent to start the vehicle, whereby the starter motor and generator M is driven unconditionally to restart the engine E. Even if the brake switch $S_7$ has been turned on, when the shift range of CVT has been operated to any of travel ranges; when the throttle opening degree has been brought to a value indicative of an opened state from a value indicative of a fully-closed state; when the vehicle has been started to move on a slope or the like after stopping thereof to reach a vehicle speed of 3 km/hr or more; when the negative pressure in the vacuum booster has become −250 mmHg or more in a gauge pressure and hence, it is necessary to lower the gauge pressure by the intake negative pressure of the engine E; or when the remaining capacity of the battery has becomes 25% or less and hence, there is a possibility that the starter motor and generator M could not be driven, it is determined that the driver has intent to start the vehicle, or it is determined that the starting of the engine E becomes necessary, whereby the starter motor and generator M is driven to restart the engine E.

Figure 7:
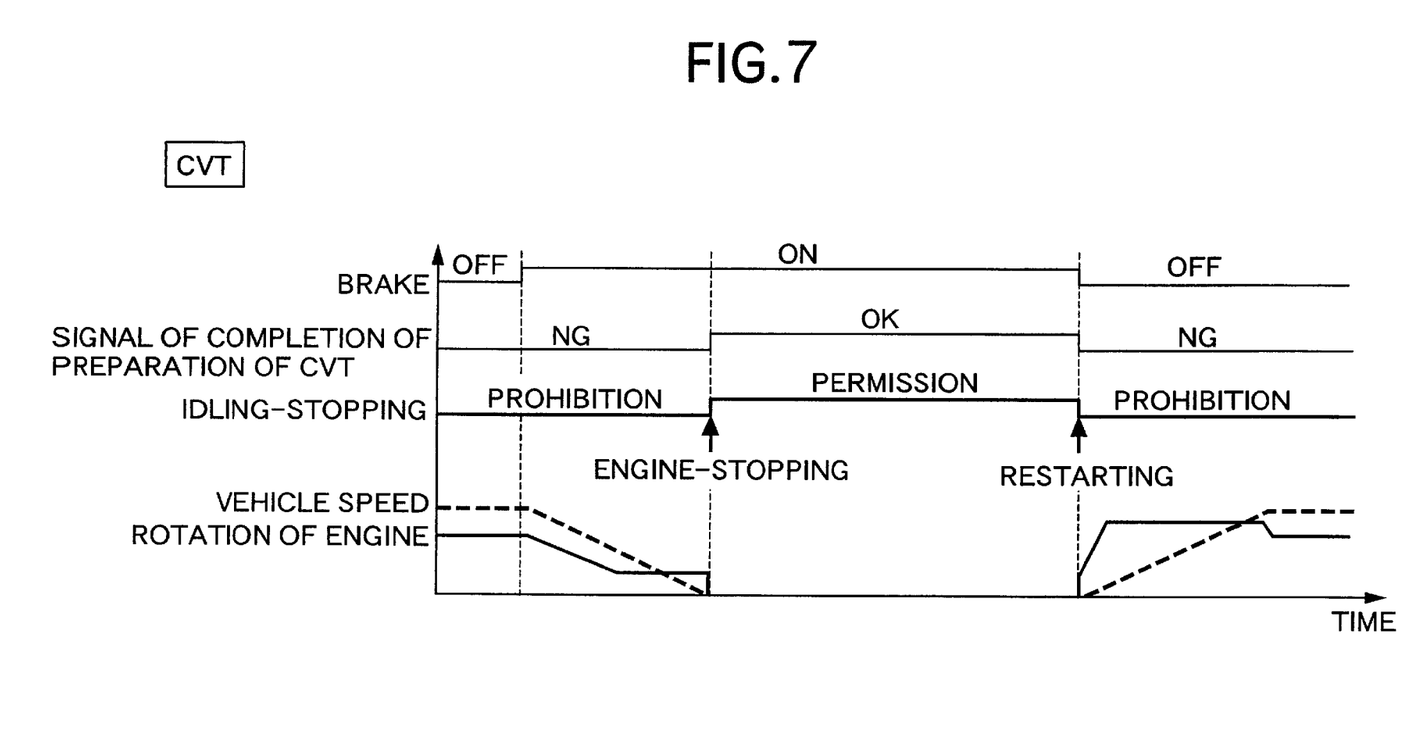
FIG. 7 is a time chart for explaining the operation.

FIG. 7 shows one example of the above-described idling-stopping and restarting of the engine in a time chart.

The control of an engine E of a vehicle including a manual transmission according to a second embodiment of the present invention will be described below with reference to FIGS. 8 to 13.

Figure 8:
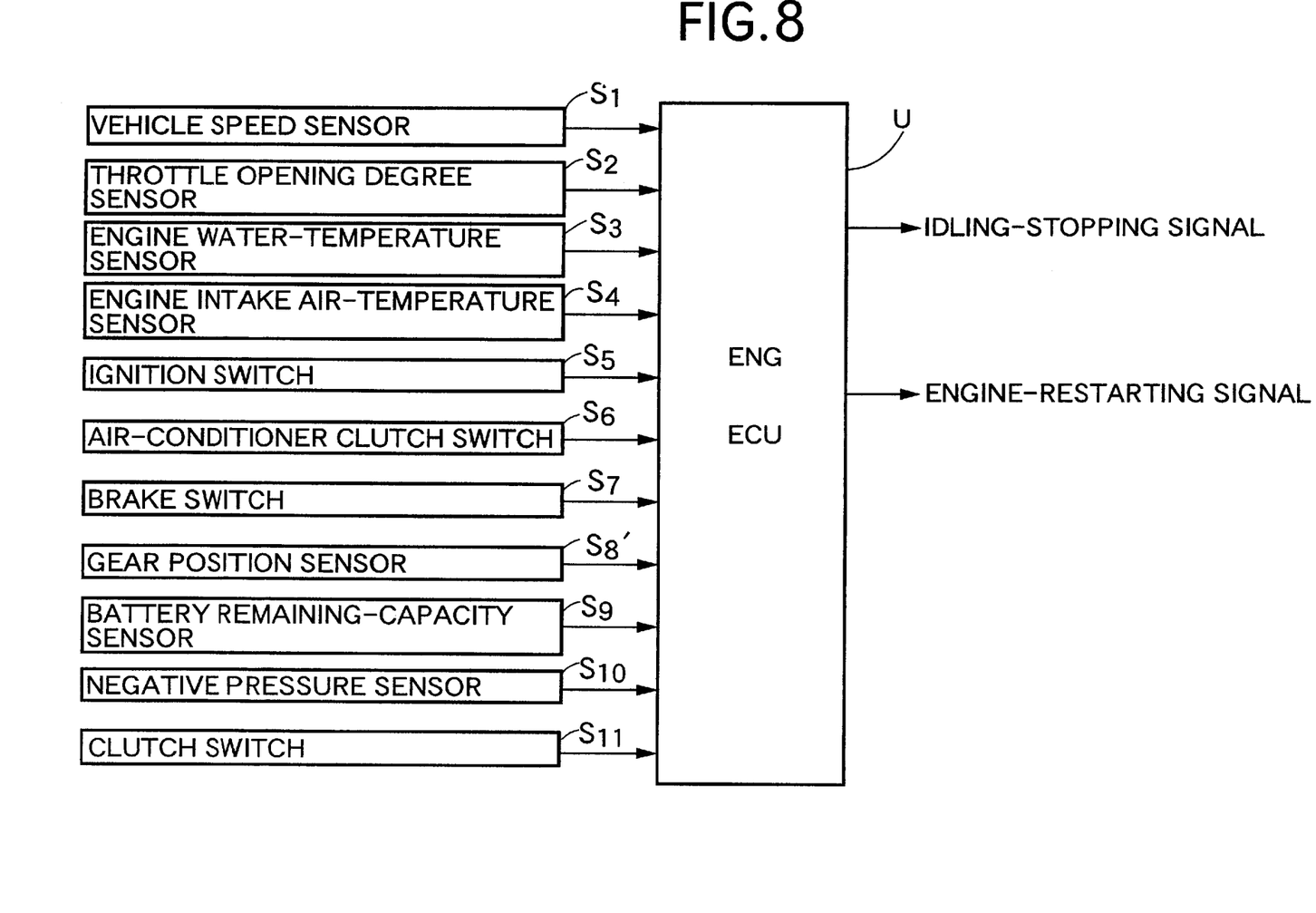
FIG. 8 is a block diagram of a control system for an engine.

As shown in FIG. 8, the following sensors and switches are connected to an electronic control unit U for governing the controlling of the stopping and starting of the engine E of the vehicle including the manual transmission: a vehicle speed sensor $S_1$; a throttle opening degree sensor $S_2$; an engine water-temperature sensor $S_3$; an engine intake air-temperature sensor $S_4$; an ignition switch $S_5$; an air-conditioner clutch switch $S_6$; a brake switch $S_7$; a gear position sensor $S_8'$ for detecting a gear position of the manual transmission; a battery remaining capacity sensor $S_9$; a negative pressure sensor $S_{10}$; and a clutch switch $S_{11}$ for detecting the operation of a clutch pedal. As can be seen by comparison of FIG. 8 with FIG. 4 showing the electronic control unit in the automatic transmission (CVT), the electronic control unit U shown in FIG. 8 is different from the electronic control unit shown in FIG. 4 in points of that the gear position sensor $S_8'$ for detecting the gear position of the manual transmission is connected thereto in place of the shift range sensor $S_8$ of the CVT, and that the clutch switch $S_{11}$, is connected thereto, and that a signal indicative of the completion of the preparation of the CVT is not input thereto. The other structure of the electronic control unit U shown in FIG. 8 is the same as in the electronic control unit U shown in FIG. 4.

When the vehicle is brought into a decelerated state during traveling thereof, cut-off of the fuel supplied to the engine E (a decelerating fuel cut operation) is carried out to reduce the amount of fuel consumed. When it is determined that such deceleration is not temporary and is intended to stop the vehicle, the supplying of the fuel is not restarted even if the engine speed is reduced to a fuel-cut canceling speed, and the fuel-cut operation is continued.

Figure 9:
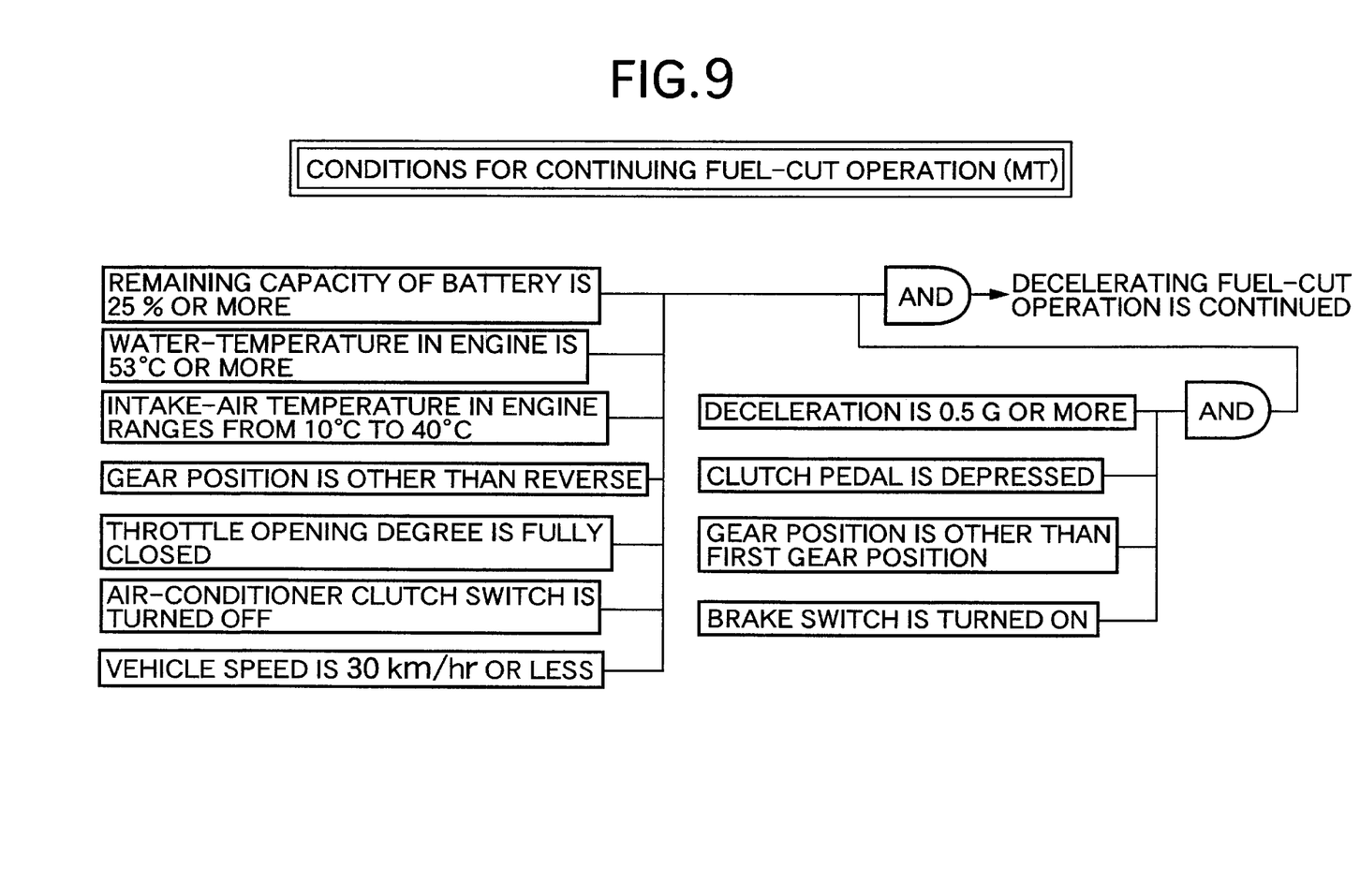
FIG. 9 is a diagram for explaining conditions for continuing a decelerating fuel-cut operation.

FIG. 9 shows conditions for continuing the fuel-cut operation. More specifically, when the driver's intent to stop the vehicle is confirmed from conditions that the deceleration of the vehicle calculated from the vehicle speed detected by the vehicle speed sensor $S_1$ is 0.5 G or more, that the depression of the clutch pedal at an idling speed or less of the engine E has been detected by the clutch switch $S_{11}$, that a gear position other than a first-gear position has been detected by the gear position sensor $S_8'$, and that the depression of the brake pedal has been detected by the brake switch $S_7$, the fuel-cut operation is continued, if the following preconditions are further established:

When the remaining capacity of the battery detected by the battery remaining-capacity sensor $S_9$ is 25% or more to permit the driving of the starter motor and generator M; the temperature of water in the engine detected by the engine water-temperature sensor $S_3$ is 53° C. or more to indicate that the warming of the engine E has been completed; the temperature of intake air in the engine detected by the engine intake air-temperature sensor $S_4$ ranges from 10° C. to 40° C., whereby the battery can exhibit the performance sufficiently; the gear position detected by the gear position sensor $S_8'$ is other than a reverse position; the throttle opening degree detected by the throttle opening degree sensor $S_2$ is a value indicative of a fully-closed state; the air-conditioner clutch switch $S_6$ has already been turned off, whereby there is not a possibility that the operation of the air-conditioner might be stopped by the stopping of the engine E; and the vehicle speed detected by the vehicle speed sensor $S_1$ is 30 km/hr or less, the fuel-cut operation is continued as it is.

Figure 10:
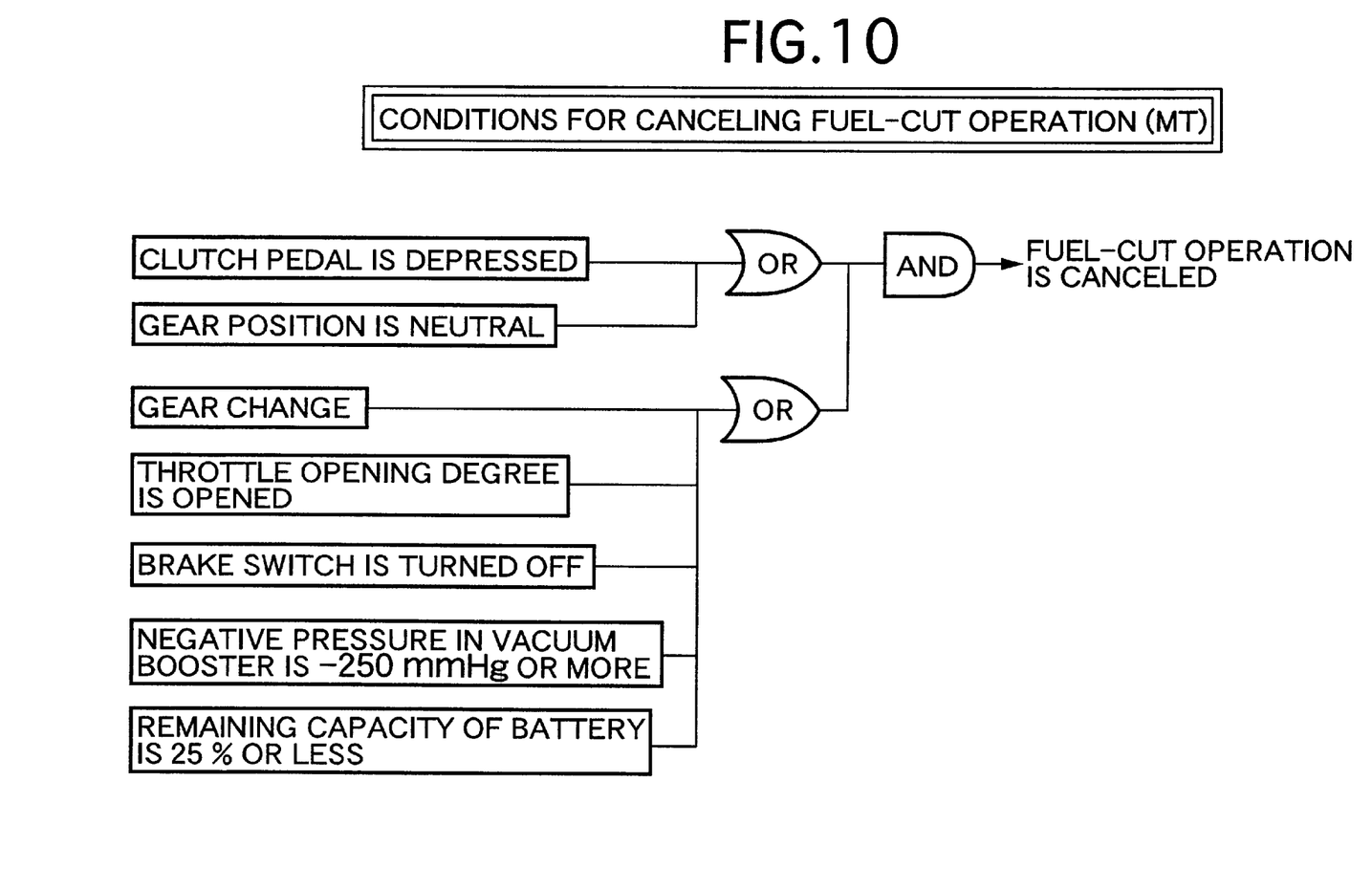
FIG. 10 is a diagram for explaining conditions for canceling the fuel-cut operation.

FIG. 10 shows conditions for canceling the fuel-cut operation during continuation of the decelerating fuel-cut operation. When the depression of the clutch pedal has been detected by the clutch switch $S_{11}$, or the neutral gear position has been detected by the gear position sensor $S_8'$, and in addition, the gear change has been detected by the gear position sensor $S_8'$, it has been detected by the throttle opening degree sensor $S_2$ that the throttle opening degree has been brought into the value indicative of the opened state from the value indicative of the fully-closed state, the releasing of the brake pedal has been detected by the brake switch $S_7$, it has been detected by the negative pressure sensor $S_{10}$ that the negative pressure in the vacuum booster for the brake device has become −250 mmHg or more in a gauge pressure, or the remaining capacity of the battery detected by the battery remaining capacity sensor $S_9$ is 25% or less, the canceling of the fuel-cut operation is carried out, so that the engine E is not stopped.

Figure 11:
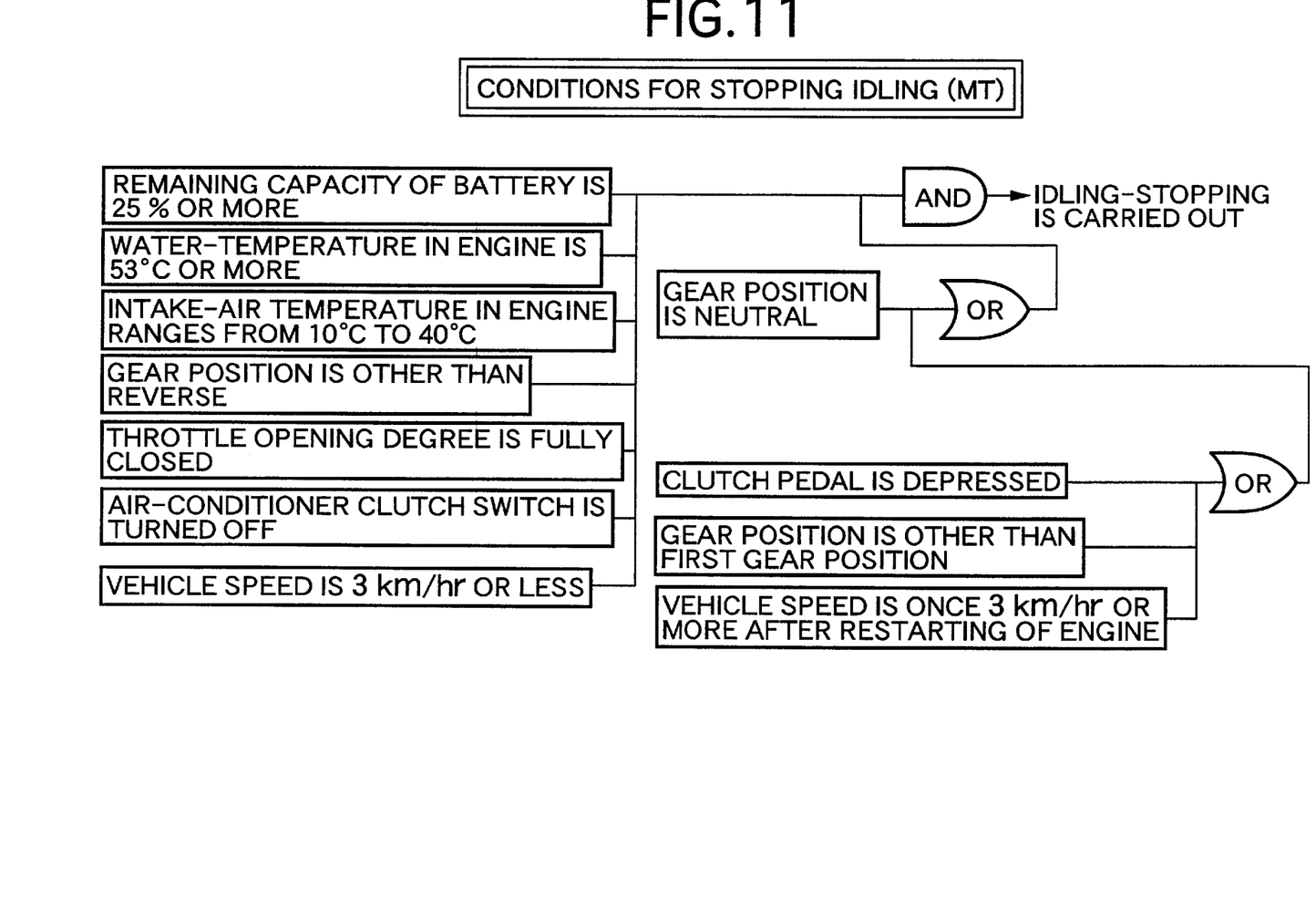
FIG. 11 is a diagram for explaining conditions for stopping the idling of the engine.

FIG. 11 shows conditions for carrying out the stopping of the idling to stop the engine E when the vehicle speed has been reduced to 0 (zero) by the continuation of the decelerating fuel-cut operation. When the gear position is neutral, or the driver has depressed the clutch pedal to provide a gear position other than the first-gear position, and the vehicle speed detected by the vehicle speed sensor $S_1$ after restarting of the engine E has once become 3 km/hr or more, and it is confirmed that the driver does not have intent to start the vehicle, the stopping of the idling is continued, if the following preconditions are further established:

When the remaining capacity of the battery is 25% or more, the temperature of water in the engine is 53° C. or more, the temperature of intake air in the engine ranges from 10° C. to 40° C., the gear position is other than the reverse position, the throttle opening degree is the value indicative of the fully-closed state, the air-conditioner clutch switch $S_6$ has already been turned off, and the vehicle speed is 3 km/hr or less, the stopping of the idling is carried out. It is the condition for stopping the idling that the vehicle speed once becomes 3 km/hr or more. Therefore, before the engine E is restarted to start the vehicle, the idling of the engine E is not stopped again.

Figure 12:
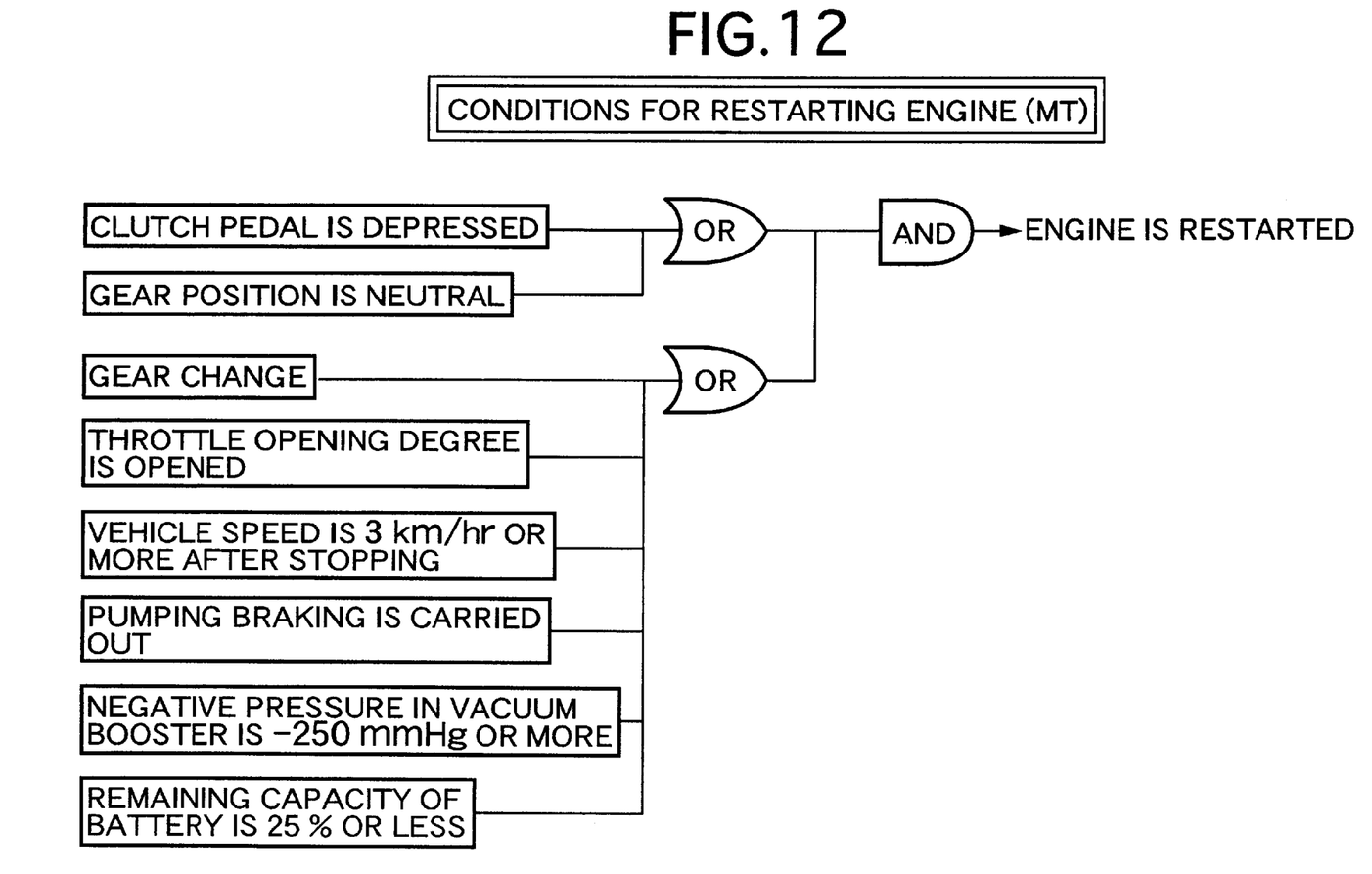
FIG. 12 is a diagram for explaining conditions for restarting the engine.

FIG. 12 shows conditions for restarting the engine E during stopping of the idling. When the clutch pedal has been depressed, or the gear position is neutral and in addition, when the gear change is detected, when the throttle opening degree has been brought into the value indicative of: the opened state from the value indicative of the fully-closed state, when the vehicle speed has become 3 km/hr or more after the stopping of the vehicle, when a pumping braking has been conducted to consume the negative pressure in the vacuum booster, when the negative pressure in the vacuum booster for the brake device has become −250 mmHg or more in a gauge pressure, or when the remaining capacity of the battery is 25% or less, the starter motor and generator M is driven to restart the engine E.

Figure 13:
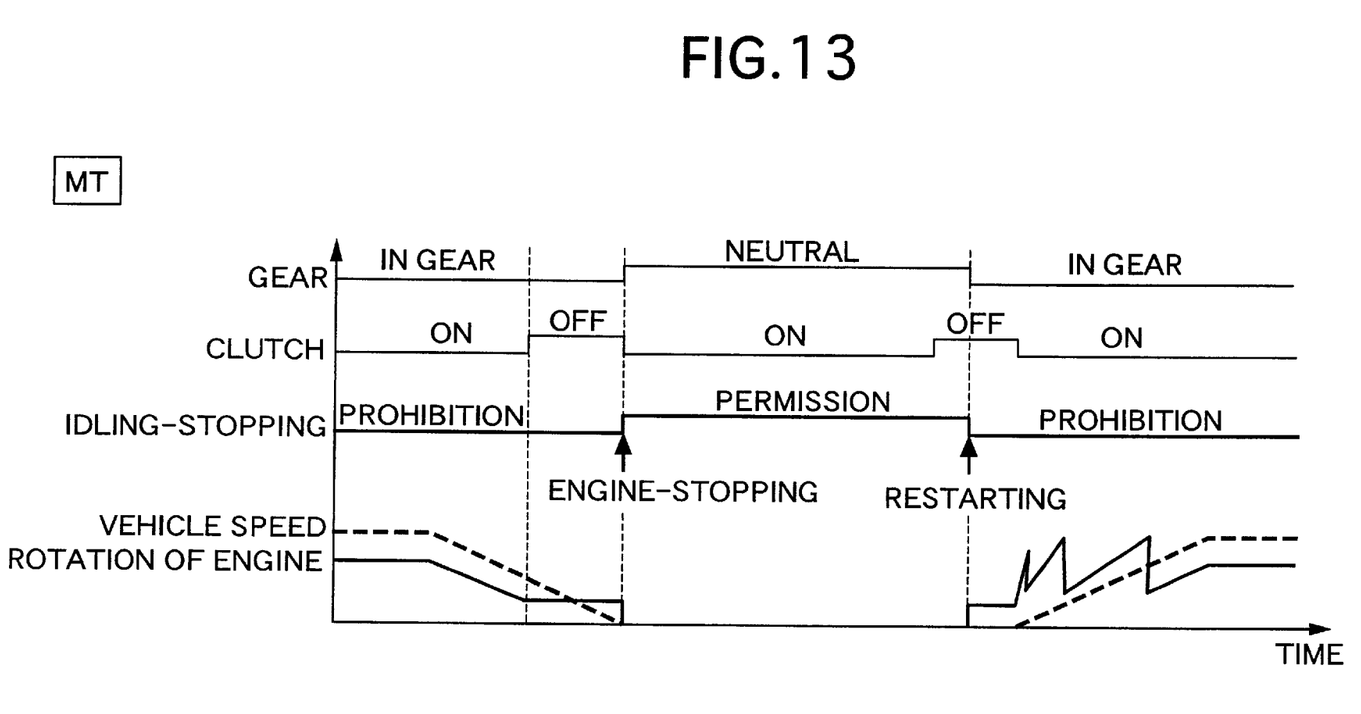
FIG. 13 is a time chart for explaining the operation according to the second embodiment.

FIG. 13 shows one example of the above-described idling-stopping and restarting of the engine in a time chart.

Although the embodiments of the present invention have been described in detail, it will be understood that various modifications in design may be made without departing from the subject matter of the invention.

For example, the CVT has been illustrated as the automatic transmission in the embodiments, but the present invention is applicable to a multi-stage automatic transmission.

INDUSTRIAL APPLICABILITY

As described above, the engine-starting and stopping system according to the present invention is applicable to any automobile using as a power source an engine including a starter motor which also serves as a generator.

What is claimed is:

1. An engine-starting and stopping system in a vehicle, including an automatically engine-starting and stopping means for automatically stopping an engine, when predetermined engine-stopping conditions have been established, and for automatically starting the engine when predetermined engine-starting conditions have been established, characterized in that said engine-starting and stopping system is comprised of a starter motor and generator for starting the engine, said starter motor and generator being accommodated within a pulley mounted on a crankshaft of the engine.

2. An engine-starting and stopping system in a vehicle according to claim 1, wherein said starter motor and generator includes a coil forming a stator, and a permanent magnet forming a rotor, said permanent magnet being mounted on an inner peripheral surface of the pulley which is formed into a hollow shape such that one side surface and an outer peripheral surface of said coil are covered by said pulley and said permanent magnet is opposed to the outer peripheral surface of said coil.

3. An engine-starting and stopping system in a vehicle according to claim 1, wherein said pulley is fixed to said crankshaft.

4. An engine-starting and stopping system in a vehicle according to claim 1, further including a power source for said starter motor separate from a general purpose battery of the vehicle.

* * * * *

UNITED STATES PATENT AND TRADEMARK OFFICE
CERTIFICATE OF CORRECTION

PATENT NO. : 6,752,112 B1
DATED : June 22, 2004
INVENTOR(S) : Ohata et al.

It is certified that error appears in the above-identified patent and that said Letters Patent is hereby corrected as shown below:

Column 2,
Line 28, between "a line" and "in FIG." change "33" to -- 3-3 --.

Column 7,
Line 47, between "of" and "the opened" delete the colon.

Signed and Sealed this

Twenty-eighth Day of December, 2004

JON W. DUDAS
*Director of the United States Patent and Trademark Office*